United States Patent [19]
Miller

[11] Patent Number: 4,780,822
[45] Date of Patent: Oct. 25, 1988

[54] SEMAPHORE CIRCUIT FOR SHARED MEMORY CELLS

[75] Inventor: Michael J. Miller, San Jose, Calif.

[73] Assignee: Integrated Device Technology, Inc., Santa Clara, Calif.

[21] Appl. No.: 908,302

[22] Filed: Sep. 17, 1986

[51] Int. Cl.[4] ............................................. G06F 13/14
[52] U.S. Cl. ............................................. 364/200
[58] Field of Search ... 364/200 MS File, 900 MS File

[56] References Cited

U.S. PATENT DOCUMENTS

| | | | |
|---|---|---|---|
| 4,096,572 | 6/1978 | Namimoto | 364/200 |
| 4,115,851 | 9/1978 | Nagano et al. | 364/200 |
| 4,214,305 | 7/1980 | Tokita et al. | 364/200 |
| 4,380,798 | 4/1983 | Shannon et al. | 364/200 |
| 4,594,657 | 6/1986 | Byrns | 364/200 |

OTHER PUBLICATIONS

Dijkstra, E. W., "The Structure of the The -Multiprogramming System", Comm. of the ACM, vol. 11, No. 5, May, 1968, pp. 341-346.

Primary Examiner—Thomas M. Heckler
Attorney, Agent, or Firm—Thomas E. Schatzel

[57] ABSTRACT

A semaphore circuit is disclosed which employs a pair of storage elements; an arbitrator, which is driven by the storage elements; and another pair of storage elements, which are driven by the arbitrator. The arbitrator includes a first and a second NOR gate. One of the inputs of the first NOR gate is connected to the output of the second NOR gate one of the inputs of which is connected to the output of the first NOR gate.

10 Claims, 1 Drawing Sheet

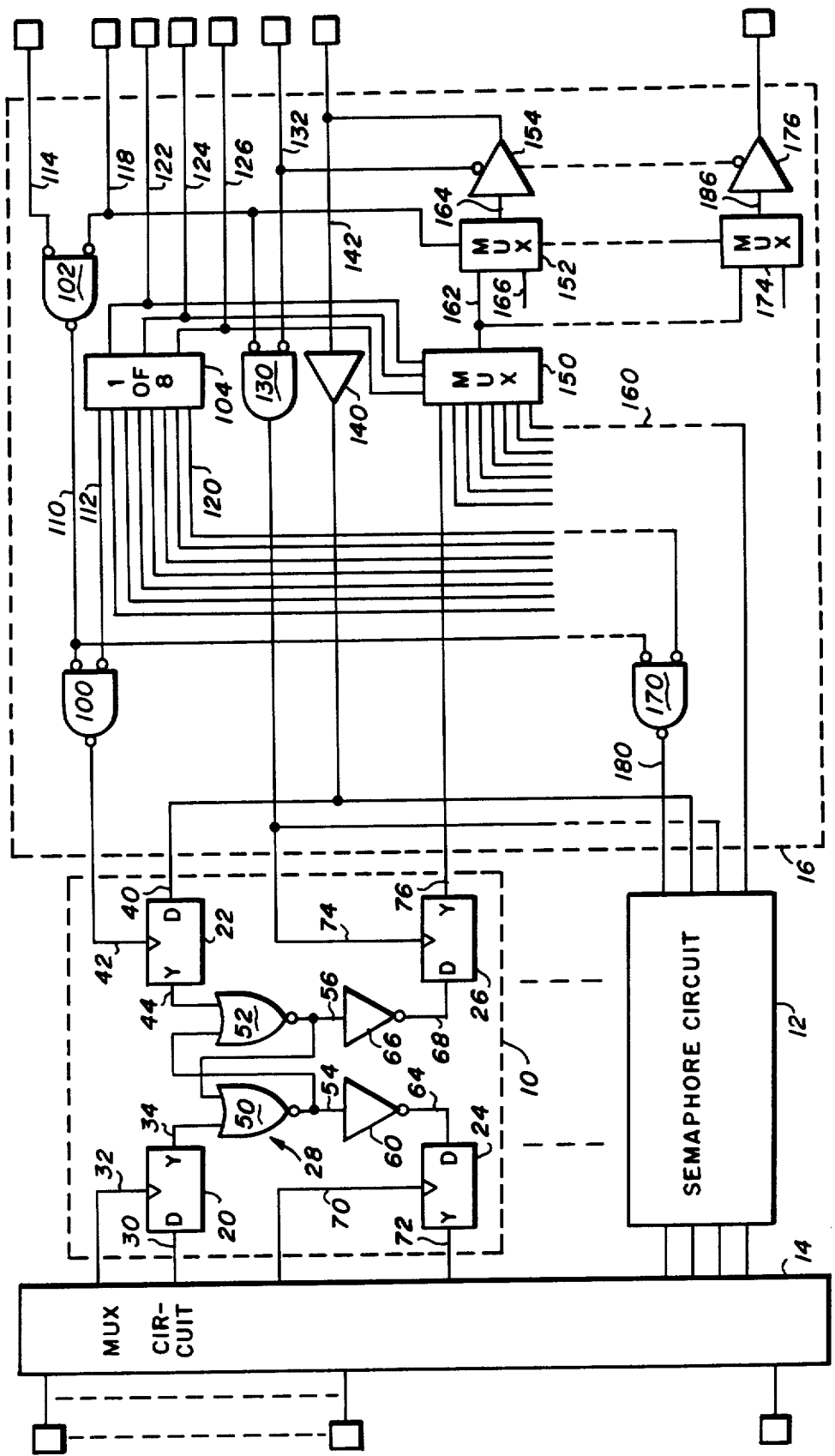

SEMAPHORE CIRCUIT FOR SHARED MEMORY CELLS

BACKGROUND OF THE INVENTION

1. Field of the Invention

The present invention relates to integrated circuit devices generally and more particularly to a semaphore for shared memory cells.

2. Description of the Prior Art

Often times it is useful to share resources, such as, for example, buses, peripherals, and/or memory cells. However, in some situations, it is also necessary to provide some restrictions on that use. One method of limiting the use of a resource is by means of a "software semaphore" of the type which was disclosed entitled 'The Structure of "THE"-Multiprogramming System' by E. W. Dijkstra in the "Communications of ACM" 11,5 of May 1968 on pages 341–346.

As an example of such a (simple, binary) semaphore, consider the sitaution in which it is desired that the use of a resource be shared by two processors, but access to the resource be limited to one processor at a time. A certain cell (location) in memory, which is accessible (shared) by both of the processors, could be designated for use in controlling access to the resource. A certain number (zero, for example) could be stored in the memory cell when the resource is not in use (available); and, another number (one, for example) could be stored in the memory cell when the resource is in use (busy). Before a processor is allowed to use the resource, the processor could be required to do the following tasks. First, the processor could be required to "read" from the memory cell (to obtain the number stored therein). Second, the processor could be required to "test" the number read (to determine its value, whether it is a zero or a one). Third, if the results of the test indicate that the resource is not in use (the number read is a zero), the processor could be required to "write" (a one) into the memory cell to indicate that the resource is in use. (If the results of the test indicate that the resource is in use (the number read is a one), the processor could be required to continue reading and testing until the resource is not in use (the number read is a zero).) Finally, when the processor is through with the resource, the processor could be required to "write" (a zero) into the memory cell to indicate that the resource is no longer in use.

Unfortunately, a period of time elapses between the time when one of the processors reads (a zero) from the memory cell and the time when that processor writes (a one) into the memory cell. During this period of time, the other processor could read from the memory cell and conclude that the resource is not in use, and, thus, available. As a consequence, both processors could attempt to use the resource at the same time. (The period of time can be reduced, but not eliminated, if the order of the tasks is changed to require that the processor write before testing.)

Memory devices of the type which are designated IDT7132 by Integrated Device Technology Inc., AMD2130 by Advanced Micro Devices Inc., and 5132 by Vitalic are suitable for shared use by two processors. The IDT7132 device employs what is referred to in the specification sheet for the device as an "arbitration circuit", a circuit for preventing both processors from using the same memory cell at the same time. Included in the arbitration circuit is what is referred to herein as an "arbitrator", specifically, a first and a second NOR gate. One of the inputs of the first NOR gate is connected to the output of the second NOR gate one of the inputs of which is connected to the output of the first NOR gate. In the arbitration circuit, signals developed by the NOR gates are used to develop a pair of (active low) "busy" signals. The busy signals are used to make one of two processors wait while the other processor is using the same memory cell.

Unfortunately, use of the above mentioned memory device and/or arbitration circuit does not solve the above mentioned problem with the software semaphore. Also, for proper operation, the above mentioned arbitration circuit requires the use of processors which have wait capability. Further, the above mentioned memory device and/or arbitration circuit only prevents the simultaneous use of the same memory cell. Some applications require that the use, by a processor, of a series of memory cells be uninterrupted.

In some of these applications timing is critical. For example, once a processor has started reading data from a series of memory cells and writing the data onto a disk or has started reading data from a disk and writing the data into a series of memory cells, it is important that the processor not be interrupted (since the disk won't wait).

In other applications it is important that the use of a series of memory cells by a processor be uninterrupted so as to prevent the use of incomplete and/or erroneous data. As an example, consider video displays in which a master processor generates a picture layout in the form of a display list and a slave processor reads the display list, interprets the list, and generates a raster image in a display buffer. As the raster image in the display buffer is put onto a video screen, the display buffer is wiped clean (in order to achieve high speed animation). As a consequence, the slave processor must continually update the display buffer. To prevent the slave processor from using an imcomplete display list, two display lists are used each stored in a separate series of memory cells. While the slave processor is using one display list to generate the raster image in the display buffer, over and over again, the master processor is generating and-/or updating the other display list.

Thus, a need exists for an unambiguous semaphore suitable for insuring the uninterrupted use, by a processor, of a series of memory cells.

SUMMARY OF THE PRESENT INVENTION

It is therefore the primary object of the present invention to provide an unambiguous semaphore suitable for use in limiting access to a resource.

Another object of the present invention is to provide a semaphore circuit which does not require the use of processors which have wait capability.

Another object of the present invention is to provide a semaphore circuit suitable for integration with other semaphore circuits, multiplexing circuits, and memory cells all within a single device.

Briefly, the presently preferred embodiment of the present invention employs a pair of storage elements; an arbitrator, which is driven by the storage elements; and another pair of storage elements, which are driven by the arbitrator. The arbitrator includes a first and a second NOR gate. One of the inputs of the first NOR gate is connected to the output of the second NOR gate one of the inputs of which is connected to the output of the first NOR gate.

The ability to provide an unambiguous semaphore suitable for use in limiting access to a resource is the principal advantage of the present invention.

Another advantage of the present invention is the ability it affords to provide a semaphore circuit which does not require the use of processors which have wait capability.

Another advantage of the present invention is the ability it affords to provide a semaphore circuit suitable for integration with other semaphore circuits, multiplexing circuits, and memory cells all within a single device.

These and other objects and advantages of the present invention will no doubt be obvious to those skilled in the art after having read the following detailed description of the presently preferred embodiment which is illustrated in the figure of the drawing.

IN THE DRAWING

FIG. 1 is a combined schematic and block diagram of the presently preferred embodiment in accordance with the present invention of eight semaphore circuits and their associated pair of multiplexing circuits.

DETAILED DESCRIPTION OF THE PREFERRED EMBODIMENT

In the presently preferred embodiment of the invention, eight similar semaphore circuits, a pair of similar multiplexing circuits, and 2K by 8 memory cells are all integrated into a single device using CMOS technology. One of the semaphore circuits is illustrated in detail in FIG. 1 of the drawing generally designated by the number 10. The additional semaphore circuits are represented by a block which is designated 12. The multiplexing circuits are shown, one represented by a block (MUX) which is designated 14 and the other illustrated in detail generally designated 16.

Semaphore circuit 10 is shown to employ as principal components four storage elements, which are respectively designated 20, 22, 24, and 26, and an arbitrator, which is generally designated 28. Storage element 20 is configured with the data (D) input connected to a line 30, the clock input connected to a line 32, and the data (Y) output connected to a line 34. Similarly, storage element 22 is configured with the data input connected to a line 40, the clock input connected to a line 42, and the data output connected to a line 44.

In the presently preferred embodiment, storage elements 20 and 22 are implemented as (low) level-triggered D-type registers. In another embodiment, registers of the type which are commonly designated 7474 are used.

Arbitrator 28 includes a pair of two-input NOR gates, which are respectively designated 50 and 52. One of the inputs of NOR gate 50 is connected by a line 56 to the output of NOR gate 52 one of the inputs of which is connected by a line 54 to the output of NOR gate 50. The other input of NOR gate 50 is coupled by line 34 to the data output of storage element 20; and, similarly, the other input of NOR gate 52 is coupled by line 44 to the data output of storage element 22. Finally, the output of NOR gate 50 is additionally connected by line 54 to the input of an inverter 60 the output of which is connected to a line 64; and, the output of NOR gate 52 is additionally connected by line 56 to the input of an inverter 66 the output of which is connected to a line 68.

Storage element 24 is configured with the data input connected to line 64, the clock input connected to a line 70, and the data output connected to a line 72. Similarly, storage element 26 is configured with the data input connected to line 68, the clock input connected to a line 74, and the data output connected to a line 76.

In the presently preferred embodiment, storage elements 24 and 26 are implemented as latches. In another embodiment, latches of the type which are commonly designated 74373 are used.

As previously indicated, block 12 represents the seven additional semaphore circuits which are similar to semaphore circuit 10. Also, as previously indicated, block 14 represent the multiplexing circuit which is similar to multiplexing circuit 16.

Multiplexing circuit 16 is shown to employ a two-input negative-input NAND gate (OR gate) 100, a two-input negative-input NAND gate (OR gate) 102, and a three-line-to-eight-line decoder 104, all for developing a signal for driving the clock input of storage element 22. Gate 100 is configured with the gate output coupled to the clock input of storage element 22 by line 42, with one of the gate inputs connected to a line 110, and with the other gate input connected to a line 112. Gate 102 is configured with the gate output connected to line 110 and with each of the two gate inputs coupled by a respective one of two lines, which are designated 114 and 118, to a respective one of tw pads, to receive a respective one of two, externally developed, semaphore circuit 10 write enabling signals. Specifically, the gate is driven by a read/write signal and an (active low) semaphore signal. The eight decoder 104 inputs are connected, the lowest order output to line 112 and the highest order output to a line 120. The three outputs of decoder 104 are coupled by a respective one of three lines, which are designated 122, 124, and 126, to a respective one of three pads, to receive a respective one of three, externally developed, semaphore circuit 10 addressing signals.

For developing a signal for driving the clock input of storage element 26, multiplexer 16 employs a two-input negative-input AND gate (NOR gate) 130. Gate 130 is configured with the gate output coupled by line 74 to the clock input of storage element 26, with one of the gate inputs connected to line 118, and with the other gate input coupled by a line 132 to a pad for receiving an externally developed (active low) semaphore circuit 10 output enabling signal.

A buffer 140 is employed configured with the buffer output coupled by line 40 to the data input of storage element 22 and with the buffer input coupled by a line 142 to a paid to couple an externally developed semaphore circuit 10 input data signal to the storage element.

For coupling a signal developed at the data output of storage element 26 to the pad connected to line 142, multiplexer 16 employs an eight-line-to-one-line multiplexer (MUX) 150, a two-line-to-one-line multiplexer (MUX) 152, and a buffer 154. The eight data inputs of multiplexer 150 are connected, the lowest order input to line 76 and the highest order input to a line 160. The three select (control) inputs of multiplexer 150 are connected each to a respective one of the three lines 122, 124, and 126; and, the data output of the multiplexer is connected to a line 162. Multiplexer 152 is configured with one of the data inputs connected to line 162, the select (control) input connected to line 118, and the data output connected to a line 164. The other data input of multiplexer 152 is connected to a line 166 to receive a signal developed by the memory cells which, for clarity, are not shown. Finally, buffer 154 is configured with the buffer input connected to line 164, the buffer tri-state output controlling input connected to line 132, and the buffer output connected to a line 142.

Additionally, for semaphore circuit 12, multiplexer 16 employs a another two-input negative-input NAND gate (OR gate) 170, another two-line-to-one-line multiplexer (MUX) 174, and another buffer 176. Gate 170 is configured with the gate output coupled by a line 180 to the clock input of the corresponding storage element of semaphore circuit 12, with one of the gate inputs connected to line 110, and with the other gate input connected to line 120. Multiplexer 174 is configured with one of the data inputs connected to line 162, with the select (control) input connected to line 118, and with the data output connected to a line 186. Finally, buffer 176 is configured with the buffer input connected on line 186, the buffer tri-state output controlling input connected to line 132, and the buffer output coupled by a line 188 to a pad.

Operationally, before a processor is allowed to use a resource, the processor is required to do the following tasks. First, the processor is required to "write" a zero into the appropriate storage element. In other words, before the processor which is connected to multiplexer 16 is allowed to use the resource, the processor is required to generate signals on the pads that are connected to the multiplexer such that a low-logic-level signal (a zero) is developed on line 40. Simultaneously, the processor is required to generate signals such that a signal having a low logic level is generated on line 42, developing a signal having a low logic level on line 44.

Second, the processor is required to "read" from the appropriate storage element. The processor which is connected to multiplexer 16 is required to generate signals on the pads that are connected to the multiplexer such that a signal which represents the state of storage element 26 is developed on the pad that is connected to line 142. (In so doing, a signal having a low logic level is generated on line 74 causing storage element 26 to store (latch) the state of the signal developed on line 68 and to develop a signal of similar state on line 76. It is necessary to store (latch) the state of the signal developed on line 68 to prevent the state of the signal from changing while it is being read, as would occur if the other processor were to relinquish the resource at this time.)

Third, the processor is required to "test" the number read (to determine its value, whether it is a zero or a one). If the results of the test indicate that the resource is not in use (the number read is a zero), the processor is free to use the resource as long as desired and as often as desired. (If the results of the test indicate that the resource is in use (the number read is a one), the processor is required to continue reading and testing until the resource is not in use (the number read is a zero). It is not necessary to continue writing, unless required to allow the state of the signal developed on line 74 to go high).

Finally, when the processor is through with the resource, the processor is required to "write" (a one) into the appropriate storage element to indicate that the resource is no longer in use. The processor which is connected to multiplexer 16 is required to generate signals on the pads that are connected to the multiplexer such that a high-logic-level signal (a one) is developed on line 40. Simultaneously, the processor is required to generate signals such that a signal having a low logic level is generated on line 42.

It is contemplated that after having read the preceeding disclosure, certain alterations and modifications of the present invention will no doubt become apparent to those skilled in the art. It is therefore intended that the following claims be interpreted to cover all such alterations and modifications as fall within the true spirit and scope of the invention.

What is claimed is:

1. A semaphore circuit comprising in combination:

first storage element means including a clock input for connection to receive an externally generated first clocking signal, a data input for connection to receive an externally generated first data input signal having a predetermined state at a time marked by said first clocking signal when one use of a resource is being requested and having another predetermined state at a time marked by said first clocking signal when use of said resource is being relinquished, and an output;

second storage element means including a clock input for connection to receive an externally generated second clocking signal, a data input for connection to receive an externally generated second data input signal having a predetermined state at a time marked by said second clocking signal when another use of said resource is being requested and having another predetermined state at a time marked by said second clocking signals when use of said resource is being relinquished, and an output;

arbitrator means including a first input coupled to said first storage element means output, a second input coupled to said second storage elements means output, a first output, and a second output;

first coupling means;

second coupling means;

third storage element means including a data input coupled by said first coupling means to said arbitrator means first output, a clock input for connection to receive an externally generated third clocking signal, and an output at which a first data output signal is developed having a predetermined state following a time marked by said third clocking signal when said requested one use of said resource is authorized; and fourth storage means including a data input coupled by said second coupling means to said arbitrator means second output, a clock input for connection to receive an externally generated fourth clocking signal, and an output at which a second data output signal is developed having a predetermined state following a time marked by said fourth clocking signal when said requested other use of said resource is authorized.

2. A semaphore circuit as recited in claim 1 wherein each of said first and second storage element means includes a D-type register.

3. A semaphore circuit as recited in claim 1 wherein said arbitrator means includes, first NOR gate means having a first input coupled to said first storage element means output, a second input, and an output coupled by said first coupling means to said third storage element means data input, and second NOR gate means having a first input coupled to said second storage element means output, a second input coupled to said first NOR gate means output, and an output coupled both to said first NOR gate means second input and by said second coupling means to said fourth storage element means data input.

4. A semaphore circuit as recited in claim 1 wherein said first coupling means includes an inverter having an input coupled to said arbitrator means first output and an output coupled to said third storage element means data input and wherein said second coupling means includes another inverter having an input coupled to said arbitrator means second output and an output coupled to said fourth storage element means data input.

5. A semaphore circuit as recited in claim 1 wherein each of said third and said fourth storage element means includes a latch.

6. A semaphore system comprising in combination:
a first multiplexer including an input for connection to receive an externally generated first input signal having a predetermined state when one use of a resource is being requested and having another predetermined state when use of said resource is being relinquished, an output at which a first output signal is developed having a predetermined state when said requested one use of said resource is authorized, and at least two sets of inputs/outputs each having a data input, a first clock output, a second clock output, and a data output;
a second multiplexer including an input for connection to receive an externally generated second input signal having a predetermined state when another use of said resource is being requested and having another predetermined state when use of said resource is being relinquished, an output at which a second output signal is developed having a predetermined state when said requested other use of said resource is authorized, and at least two sets of inputs/outputs each having a data input, a first clock output, a second clock output, and a data output;
at least two semaphore circuits each connected to a corresponding one of said sets of said inputs/outputs of said first multiplexer and each connected to a corresponding one of said sets of said inputs/outputs of said second multiplexer, at least one of said semaphore circuits including
first storage element means having a data input connected to said data output of said corresponding one of said sets of said inputs/outputs of said first multiplexer, a clock input connected to said first clock output of said corresponding one of said sets of said inputs/outputs of said first multiplexer, and an output;
second storage element means having a data input connected to said data output of said corresponding one of said sets of said inputs/outputs of said second multiplexer, a clock input connected to said first clock output of said corresponding one of said sets of said inputs/outputs of said second multiplexer, and an output;
arbitrator means having a first input coupled to said first storage element means output, a second input coupled to said second storage element means output, a first output, and a second output;
first coupling means;
second coupling means;
third storage element means having a data input coupled by said first coupling means to said arbitrator means first output, a clock input connected to said second clock output of said corresponding one of said sets of said inputs/outputs of said first multiplexer, and an output connected to said data input of said corresponding one of said sets of said inputs/outputs of said first multiplexer; and
fourth storage element means having a data input coupled by said second coupling means to said arbitrator means second output, a clock input connected to said second clock output of said corresponding one of said sets of said inputs/outputs of said second multiplexer, and an output connected to said data input of said corresponding one of said sets of said inputs/outputs of said second multiplexer.

7. A semaphore system as recited in claim 6 wherein said second multiplexer includes selecting means, said selecting means being responsive to at least one externally generated addressing signal and operative to select one of said semaphore circuits.

8. A semaphore system as recited in claim 7 wherein said selecting means is connected to said clock input of said second storage element means of said one of said semaphore circuits and wherein said selecting means is further operative to develop a signal for clocking said second storage element means of said one of said semaphore circuits when said one of said semaphore circuits is selected.

9. A semaphore system as recited in claim 7 wherein said selecting means is connected to said clock input of said fourth storage element means of said one of said semaphore circuits and wherein said selecting means is further operative to develop a signal for clocking said fourth storage element means of said one of said semaphore circuits when said one of said semaphore circuits is selected.

10. A semaphore system as recited in claim 6 wherein said second multiplexer includes means for coupling said second multiplexer externally generated signal to said data input of said second storage element means of said one of said semaphore circuits.

* * * * *